K. KRNKA.
AUTOMATIC FIREARM.
APPLICATION FILED AUG. 8, 1913.
1,166,913.
Patented Jan. 4, 1916.
2 SHEETS—SHEET 1.
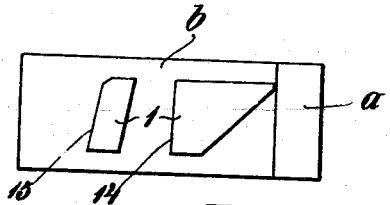
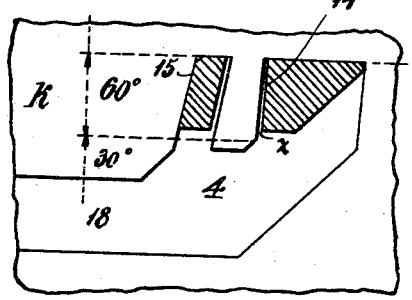
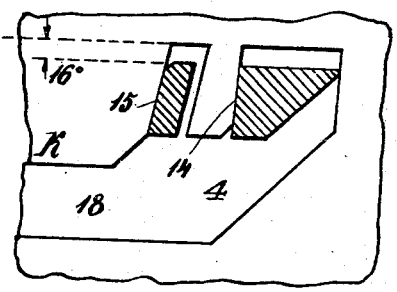
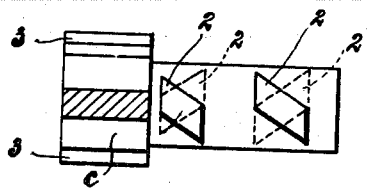
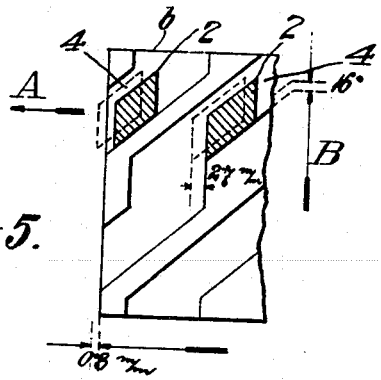
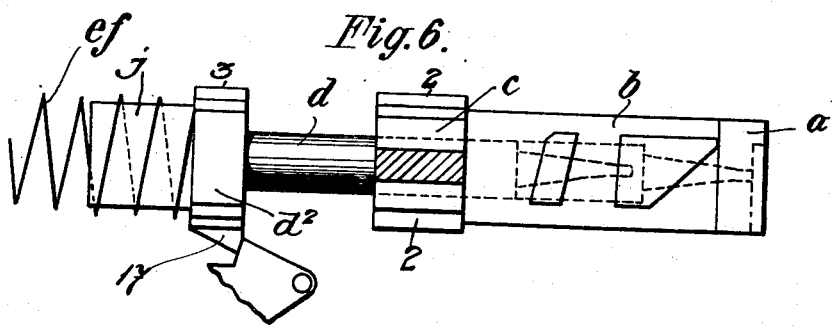
WITNESSES:
John C. Sanders
Albert F. Heuman
INVENTOR:
Karl Krnka
ATTY K. KRNKA.
AUTOMATIC FIREARM.
APPLICATION FILED AUG. 8, 1913.
1,166,913.
Patented Jan. 4, 1916.
2 SHEETS—SHEET 2.
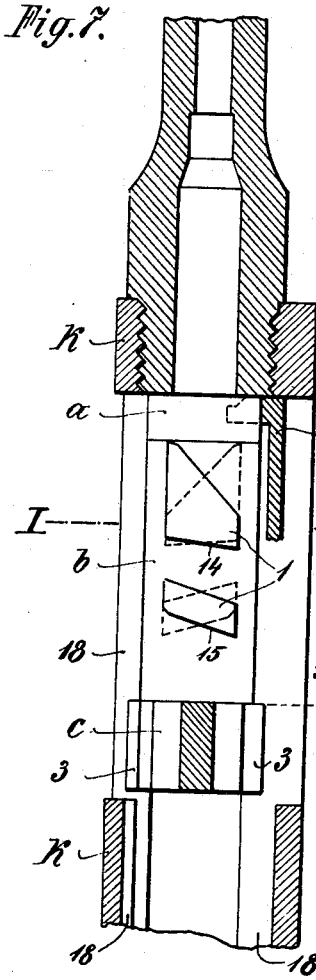
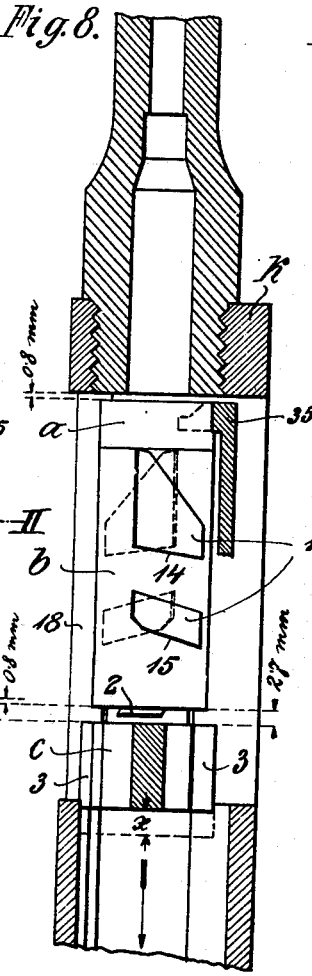
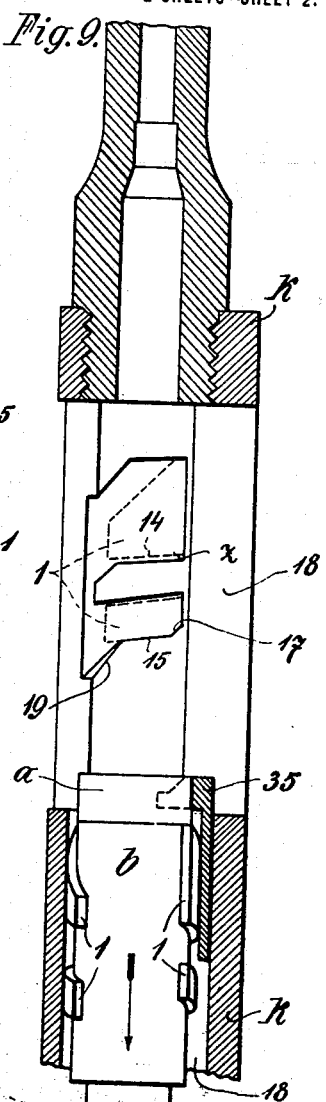
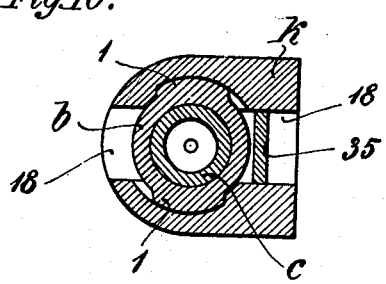
WITNESSES:
John C. Sanders
M. B. Cottrell
INVENTOR:
Karl Krnka
BY Wallace White
ATTY

UNITED STATES PATENT OFFICE.

KARL KRNKA, OF HIRTENBERG, AUSTRIA-HUNGARY.

AUTOMATIC FIREARM.

1,166,913.   Specification of Letters Patent.   Patented Jan. 4, 1916.

Application filed August 8, 1913.   Serial No. 783,691.

*To all whom it may concern:*

Be it known that I, KARL KRNKA, engineer, a subject of the Emperor of Austria-Hungary, whose post-office address is Hirtenberg, Empire of Austria-Hungary, have invented certain new and useful Improvements in Automatic Firearms, of which the following is a specification.

In Letters Patent 1,018,914 granted to me Feb. 27, 1912, I have described a breech mechanism for automatic fire arms in which the head of the rigidly locked breech bolt is able to move a short distance to the rear and the cartridge case is able to move back for a limited short distance during the shot. For this purpose a small space is provided between the rigidly locked breech bolt and the bolt head. When this space is equal to, for example, 1.2 mm., then the cartridge case, as also the bolt head must both move back to a distance of 1.2 mm., whereby the unlocking member $c$ is thrown back compulsorily only to a distance of 1.2 mm. The further action is done solely by the energy of the motion. The greater the space between the breech bolt and the bolt head the greater will be the momentum imparted to the unlocking member. This, however, increases the strain on the cartridge case.

This invention has for its object to avoid these drawbacks by providing the necessary space for the rearward movement of the bolt head at another point of the breech mechanism, thereby attaining an advantageous ratio of transmission of motion, whereby the accompanying impact for the unlocking member is prolonged, although the cartridge case makes a similar movement and is subjected to less strain.

One form of this invention is illustrated by way of example in the accompanying drawings in which:—

Figure 1 is the breach bolt with its head. Figs. 2 and 3 show a part of the developed casing in different positions. Fig. 4 shows the unlocking member with the rotary lugs. Fig. 5 shows the breech bolt opened out, and Fig. 6 shows the breech mechanism. Figs. 7 to 9 show the firearm in longitudinal section, the breech bolt being shown in its different positions. Fig. 10 is a sectional view taken on the line I—II of Fig. 7.

The breech bolt $b$ with head $a$ is formed in the usual manner, but without a space between the breech bolt and the bolt head. The two right hand bolt lugs 1, differ from the known construction only by the feature that the impact surfaces 14 and 15 of the bolt lugs have different pitches or inclinations. For example, if the screw surface 14 has for instance a pitch of 1 mm. for 60 degrees, the surface 15 has a pitch of 3 mm. for 60 degrees. The manner of locking and unlocking is effected, however in the present case exactly as in the case of the breech mechanism described in my aforesaid patent. Likewise the manner of operation of the fire arm is the same.

The development of a part of the breech bolt sleeve $k$ (Fig. 2) shows the grooves 18 in which the bolt lugs move forward and also shows the laterally deflected locking grooves. The bolt lugs in Fig. 3 are shown in completely locked position. As shown in Fig. 2, the impact surface 15 fits home, but behind the impact surface 14 there is left a space $z$ of 0.8 mm. Since the impact surface 15 has for 60 degrees such a considerable rise or pitch as 4 mm. it is not able to offer a rigid resistance to the force of the explosion, and therefore during the shot it slides into the position shown in Fig. 3. At this instant the intermediate space behind the surface 14 disappears, so that the locking of the breech mechanism is rendered rigid, because the pitch of the impact surface 14 has only 1 mm. for 60 degrees, and therefore the front lug is able to offer a complete resistance. The bolt has therefore rotated together with its lugs through 16 degrees, and the breech bolt sleeve bolt head and bolt have been moved back 0.8 mm.

The construction of the unlocking member $c$ with its two pairs of oppositely disposed and inclined lugs 2, and of the breech bolt with the helical grooves or guideways 4, are clearly shown in Figs. 4 and 5 and correspond to the like parts exhibited in my U. S. patent referred to.

The helical grooves 4 are made wider toward the rear end in order to provide in an advantageous manner quite an appreciable amount of play or loose motion for the lugs 2. Fig. 3 shows the bolt after it has rotated through 16 degrees, in consequence of the limited rearward movement of 0.8 mm. When therefore the bolt $b$ rotates through 16 degrees in the direction of the arrow B (Fig. 5) the lugs 2 move into the position shown in broken lines, because the unlocking member (Fig. 4), owing to the arrangement of the bars 3—3 is not able to rotate with them, but is compelled to slide back in the direction of the arrow A (Fig. 5). The result of the rotation of the bolt through 16 degrees is that the lugs as well as the unlocking member have been pushed back to 2.7 mm. because this unlocking member forms one piece with the lugs. This distance of 2.7 mm. is the result of calculation, because the pitch of the lugs 2 and their grooves amounts to 10 mm. for 60 degrees. To the 2.7 mm. there must be further added 0.8 mm., because the rotation B of 16 degrees has produced a sliding movement of the bolt $b$ in the direction of the arrow C to the extent of 0.8 mm. The compulsory total sliding movement of the unlocking member is therefore proved to be $$2.7 + 0.8 = 3.5 \text{ mm.}$$

whereas the breech bolt sleeve, the bolt head and the bolt were pushed back only to the extent of 0.8 mm. Consequently by this ratio of transmitting the shock, the momentum of the unlocking member $c$ is more than quadrupled. The use of this effective ratio or transmission thus renders an extremely small amount of rearward movement of the end of the breech bolt sleeve sufficient. In the present case there is nothing to prevent the bolt $b$ and the head $a$ (Fig. 1) being made in one piece if desired. The first position of the lugs 2 corresponds to the position shown in Fig. 2, while the lugs shown in broken lines in Fig. 5 correspond to the position shown in Fig. 3. At the moment illustrated by Fig. 3, the projectile has left the muzzle of the fire arm, because so long as the surface 14 of the locking lug is receiving the gas pressure, the unlocking member $c$ cannot effect a further rotation of the bolt. For the sake of certainty, however, a small dead or loose motion of about 5 mm. is allowed to the four lugs by extending the unlocking grooves by 5 mm. in the rearward direction (Fig. 5). When therefore the unlocking member $c$ has been thrown back through a distance of $$2.7 + 0.8 = 3.5 \text{ mm.}$$

it must still move idly through a farther distance of 5 mm. before it commences to open the breech by reason of its acquired kinetic energy.

The opening and closing of the breech take place in exactly the same manner as described in my aforesaid patent.

Fig. 7 illustrates the completely locked breech, the bolt lugs 1 of which together with their impact surfaces 14 and 15 assume the position which is shown in Fig. 2. The breech bolt sleeve $k$ is rigidly screwed to the barrel, the head $a$, the breech bolt $b$ and the unlocking member $c$ are completely thrust forward so that the cartridge case is forced home into the chamber.

The head $a$ can not execute a rotary movement in the breech bolt sleeve $k$ being prevented from doing so purposely by the ejector-rod 35. The internal construction of the breech bolt $b$ is disclosed in Fig. 5, while the details of the unlocking member $c$ are clearly shown in Fig. 4, being moreover also disclosed in the U. S. Patent 1,018,914. Fig. 9 illustrates the completely unlocked breech and the guides (helically shaped grooves) of the unlocking member $c$ are plainly visible. The bolt-lugs 1 contained in these said guides have been indicated by dotted lines in Fig. 5, so that the space $z$ of the left hand lugs may be clearly seen. In Fig. 2 the space $z$ of the right hand lugs 1 is shown. Thus it follows that the bolt-lugs are shown in Fig. 7 in the same position in which they are indicated by dotted lines in Fig. 9. The unlocking member $c$ is likewise unable to execute a rotary movement as it can only be led along in a straight line in consequence of the bars 3. The peculiar manner in which the bolt-lugs 1 are lodged in the guides on the breech bolt being completely locked is not only illustrated by Figs. 2 and 9, but also in Fig. 10. When the cartridge is discharged the members $a$, $b$ and $c$ of the breech move into the position shown by Fig. 8. The corresponding position of the bolt-lugs 1 is shown in Fig. 3. The breech bolt has rotated through 16° in consequence of the pressure exerted by the rear end of the cartridge, this by reason of the co-action between the lugs 2 and guideways 4, as indicated in Fig. 5, and as a result of which the impact surface 14 has been brought up to an absolute close contact, the said space $z$ having disappeared. By this means the breech-bolt $b$ together with the head $a$ have been moved back 0.8 mm. as is shown by Figs. 3 and 8. Simultaneously with the above, the unlocking member $c$ in Fig. 8 has been thrown rearward 2.7 mm. out of the breech-bolt $b$ as the said unlocking member maintains a relation to the breech-bolt $b$ similar to that of a screw to its nut, as is disclosed in Figs. 4 and 5. If now the position assumed by the unlocking member $c$ in Fig. 7 is compared with that assumed in Fig. 8 it will be seen that the said unlocking member has been thrown back compulsorily all in all by 3.5 mm.

$$(2.7 + 0.8 = 3.5)$$

while the breech-bolt on the other hand has only been forced back 0.8 mm., maintaining this position (Fig. 8) immovably for the space of a moment, while, for its part, the unlocking member $c$ continues to idly run back for the distance $x$ in view of the fact that the inner thread of the breech-bolt is provided with a back-lash, as indicated in Fig. 5. Now while the unlocking member *c* (as per Fig. 8) pursues the distance *x* the projectile has already left the muzzle of the fire arm. It thus follows that the unlocking piece *c* has obtained a great deal of kinetic energy, and by the force of momentum continues beyond the distance *x* while at the same time, and in consequence of its rearward movement beyond *x*, causing the breech-bolt to rotate in such a manner that the noses of the bolt-lugs 1 (Fig. 9) fit onto the screw surfaces 19 (Fig. 9). The pitch of these said screw surfaces is however so great that the breech-bolt *b* is not held up in its movement thereby entering along with its bolt-lugs 1 into the longitudinal grooves 18 and being obliged to completely slide back as is shown by Fig. 9. This Fig. 9 moreover discloses that the unlocking member *c* has still farther moved out of the breech-bolt *b* in the course of the movement above described and in the position now assumed the members *a*, *b* and *c* together with their auxiliary parts slide back as a result of which a closing or accumulator spring *e f* is compressed in the manner already known in connection with automatic firearms. By the subsequent expansion of the said spring the bolt-lugs 1 of the breech-bolt *b* (Fig. 9) reassume the position indicated by broken lines in Fig. 9 as a result of which the position disclosed by Fig. 7 is again obtained.

An advantageous simplification of the breech mechanism is produced when the spring *e f* constitutes the closing spring and also the firing spring, the firing pin *d* being able to move freely to and fro in the head *a* and in the unlocking member *c* without being able to carry the unlocking member with it, for instance owing to a repulsion (on striking the percussion cap). Consequently in the closing of the breech all the parts *a b c* and *d* will be moved forward compulsorily by the force of the spring *e f* until the nose 17 of the firing pin *d* is caught by the trigger sear *s* as shown in Fig. 6. From this instant the parts *a b* and *c* are caused to move by reason of their acquired momentum into their closing positions as shown in Fig. 6. After the trigger is pulled, the firing pin *d* joins the other parts compulsorily. As a consequence of this simplification the lugs 16 and annular groove 17 in the breech bolt sleeve described in my aforesaid patent may be dispensed with.

The breech bolt *b* is designed to be actuated to impart initial unlocking movement to the breech bolt sleeve *k* synchronously with the firing of the cartridge, and to this end the head *a* is provided. The head is mounted within the forward end of the breech bolt sleeve and is designed to have a relatively short axial movement independently of the breech bolt sleeve, the extent of this movement being indicated by the character *z*. The head is secured against axial displacement in the breech bolt sleeve through the medium of the ejector rod 35, as clearly shown in Figs. 7, 8 and 9.

The means for closing and locking the breech bolt sleeve following its recoil under gas pressure consists of the accumulator spring *e f* which, at one end is coiled about a stud *j* projecting rearward from the firing pin head $d^2$, the other end of the spring being disposed to bear against the rear wall of the breech casing C, which casing is in all essential respects a counterpart of that shown in my U. S. patent to which reference has been made.

As outlined at the beginning of the specification, the salient object of the invention is to shift the recoil space for the bolt head from its front to another point, in this instance to its rear, and this is accomplished, first by having the bolt head rigid with the bolt, and secondly by the provision of the novel arrangement of the lugs 1 and 2, and the guideways 4, together with the other elements coacting therewith, notably the accumulator spring, the arrangement and operation of which eliminates the necessity of the employment of the spring 23 shown and described in my U. S. patent, thereby materially simplifying the construction of the breech mechanism, thus measurably increasing its wear resisting qualities and minimizing its liabiltiy to breakage.

Having now particularly described and ascertained the nature of my said invention and in what manner the same is to be performed, I declare that what I claim is:—

1. In firearms, in combination, a breech casing provided with longitudinally extending grooves having laterally extending locking grooves communicating therewith, and a breech bolt rotatable within said casing and provided with front and rear lugs adapted to engage said locking grooves, said lugs having impact surfaces co-acting with the rear walls of said locking grooves when the firearm is discharged, said impact surfaces differing from one another in pitch or inclination.

2. In firearms, in combination, a breech casing provided with longitudinally extending grooves having laterally extending locking grooves communicating therewith, and a breech bolt rotatable within said casing and provided with front and rear lugs adapted to engage said locking grooves, said lugs having impact surfaces co-acting with the rear walls of said locking grooves when the firearm is discharged, the pitch or inclination of the impact surface of the rear lug being greater than the pitch or inclination of the impact surface of the front lug.

3. In firearms, in combination, a breech casing provided with longitudinally extending grooves having laterally extending locking grooves communicating therewith, and a breech bolt rotatable within said casing and provided with front and rear lugs adapted to engage said locking grooves, said lugs having impact surfaces co-acting with the rear walls of said locking grooves when the firearm is discharged there being a space between the impact surface of the front lug and the rear wall of its corresponding locking groove when the breech block is in firing position, said impact surfaces differing from one another in pitch or inclination.

In testimony whereof I have signed my name to the foregoing specification in the presence of two subscribing witnesses.

KARL KRNKA.

Witnesses:
 GUSTAV WOLFF,
 AUGUST FUGGER.

Copies of this patent may be obtained for five cents each, by addressing the "Commissioner of Patents, Washington, D. C."